(12) United States Patent
Thomson

(10) Patent No.: US 12,474,020 B1
(45) Date of Patent: Nov. 18, 2025

(54) HEATING OF EVACUATION SYSTEMS

(71) Applicant: Air Cruisers Company, LLC, Wall Township, NJ (US)

(72) Inventor: Christian Thomson, Manasquan, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 491 days.

(21) Appl. No.: 17/677,787

(22) Filed: Feb. 22, 2022

Related U.S. Application Data

(62) Division of application No. 16/119,000, filed on Aug. 31, 2018, now Pat. No. 11,287,088.

(60) Provisional application No. 62/625,218, filed on Feb. 1, 2018.

(51) Int. Cl.
| | |
|---|---|
| *F17C 5/06* | (2006.01) |
| *H05B 6/10* | (2006.01) |
| *B64D 25/14* | (2006.01) |
| *B64D 25/18* | (2006.01) |

(52) U.S. Cl.
CPC ............. *F17C 5/06* (2013.01); *H05B 6/108* (2013.01); *B64D 25/14* (2013.01); *B64D 25/18* (2013.01); *F17C 2250/0631* (2013.01)

(58) Field of Classification Search
CPC . H05B 6/108; H05B 3/06; H05B 3/44; H05B 2203/02; B64D 25/14; B64D 25/18
USPC ........ 219/202, 386, 521, 529, 535, 539, 437
See application file for complete search history.

(56) References Cited

U.S. PATENT DOCUMENTS

| | | | | |
|---|---|---|---|---|
| 5,655,790 | A | * | 8/1997 | Faigle ............... B60R 21/264 222/3 |
| 9,150,462 | B2 | | 10/2015 | Deshpande et al. |
| 9,403,598 | B2 | | 8/2016 | Deshpande et al. |
| 11,287,088 | B1 | | 3/2022 | Thomson |
| 2002/0140217 | A1 | * | 10/2002 | Wynsberghe ......... B60R 21/26 280/741 |
| 2015/0033974 | A1 | * | 2/2015 | Deshpande ............. C06D 5/00 102/530 |
| 2019/0329852 | A1 | * | 10/2019 | Cagnin ..................... B63C 9/23 |

FOREIGN PATENT DOCUMENTS

WO     2018104005     6/2018

OTHER PUBLICATIONS

U.S. Appl. No. 16/119,000, Advisory Action mailed on Sep. 27, 2021, 5 pages.
U.S. Appl. No. 16/119,000, Final Office Action mailed on Aug. 2, 2021, 14 pages.
U.S. Appl. No. 16/119,000, Non-Final Office Action mailed on May 19, 2021, 11 pages.
U.S. Appl. No. 16/119,000, Notice of Allowance mailed on Dec. 15, 2021, 10 pages.

\* cited by examiner

*Primary Examiner* — Phuong T Nguyen
(74) *Attorney, Agent, or Firm* — Kilpatrick Townsend & Stockton LLP

(57) ABSTRACT

Embodiments of the present disclosure relate generally to systems and methods for controlling the temperature of inflatable evacuation systems. Specific examples provide a system that heats at least one portion of an inflation system of the evacuation system in order to regulate the temperature of the inflation gas.

20 Claims, 12 Drawing Sheets

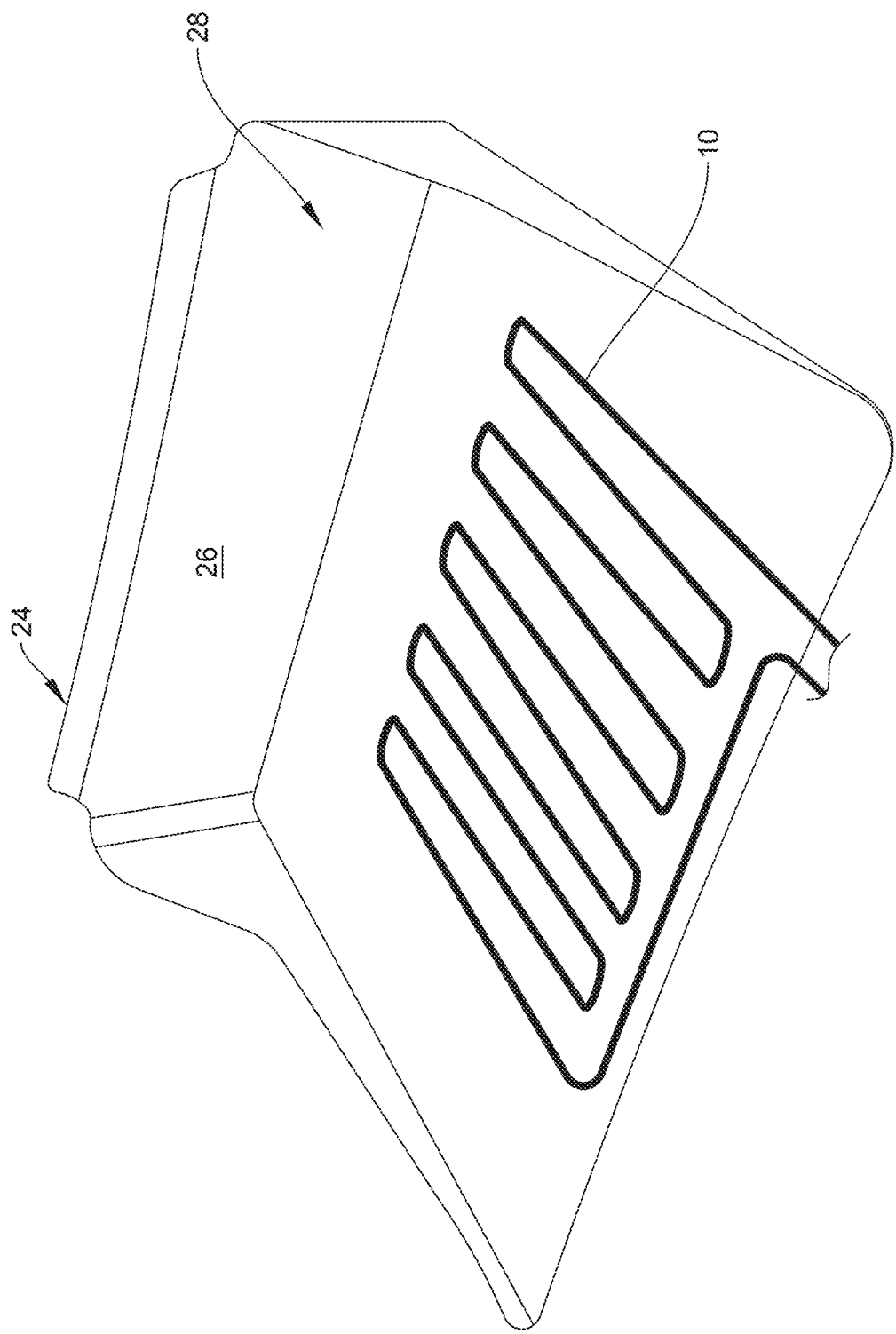

HEATING OF EVACUATION SYSTEMS

CROSS REFERENCE TO RELATED APPLICATIONS

This application is a division of allowed U.S. patent application Ser. No. 16/119,000, filed Aug. 31, 2018, titled "Heating of Evacuation Systems," which claims the benefit of U.S. Provisional Application Ser. No. 62/625,218, filed Feb. 1, 2018, titled "Heating of Evacuation Systems," the entire contents of both of which applications are hereby incorporated by reference herein in their entireties.

FIELD OF THE DISCLOSURE

Embodiments of the present disclosure relate generally to systems and methods for controlling the temperature of inflatable evacuation systems. Specific examples provide a system that heats at least one portion of an inflation system of the evacuation system in order to regulate the temperature of the inflation gas.

BACKGROUND

The Federal Aviation Administration (FAA) requires that evacuation slides and evacuation slide/rafts be provided on all aircraft doors where the floor is six feet (1.8 meters) or more above the ground. Additionally, Federal Air Regulations require that aircraft traveling over water for more than fifty nautical miles from the nearest shore must be equipped with a life preserver or an approved flotation means for each occupant. Such floatation devices are usually inflatable devices, such as life rafts or evacuation slides that can subsequently be used as life rafts (evacuation slides/rafts).

Such inflatable devices are typically packed within a lacing cover, a packboard, and/or within a door slide bustle and mounted on-board the aircraft. These containment systems keep the inflatable device and its related components, such as the corresponding inflation system, safely contained and away from passenger interference until/unless the inflatable device is needed in an emergency situation.

Such life rafts, evacuation slides, and evacuation slide/rafts are generally provided with one or more inflatable chambers. The inflatable chambers must inflate quickly and reliably. Current FAA regulations require evacuation of the entire aircraft in ninety seconds using only 50% of the available evacuation exits. To meet this requirement, evacuation slides and evacuation slide/rafts should deploy in less than about six seconds. Therefore, inflatable evacuation slides and evacuation slide/rafts and life rafts are required to meet a minimum operating pressure in a pre-determined time. This is typically achieved through the use of a precisely measured compressed gas charge delivered by a corresponding inflation system.

On typical modern commercial aircraft, the weight of the pressure vessel of the inflation system is almost twenty five pounds, and the weight of the gas charge is more than eighteen pounds. This totals more than forty extra pounds for the inflation system alone, even before accounting for the weight of the inflatable evacuation device itself. Accordingly, it is desirable to reduce the size and weight of inflation systems required for inflatable evacuation equipment in order to improve the payload volume, weight, and fuel economy of the aircraft on which they are mounted.

As further background, temperature dependence influences the amount of compressed gas needed to achieve a precisely measured compressed gas charge. The colder the compressed gas charge, the higher the weight of the compressed gas needed to inflate an evacuation slide, evacuation slide/raft, or life raft. For example, at extreme low temperature conditions, the required pressure of compressed gas can be as high as 33% more than the required pressure at standard ambient temperature. However, because aircraft evacuation equipment must be capable of being deployed within the required time limits at even extreme temperatures, this requires the inflation systems carried on-board to be heavier and larger than what is typically required in almost all cases closer to ambient temperatures (although deployment is not usually done at extremely low temperature conditions, the equipment must still be designed and prepared for operation at such low temperature conditions).

Temperature swings on an aircraft can also potentially accelerate the aging process of the contained evacuation system. Expansion and contraction of metal parts can cause loosening of fittings and seals, as well as cause stress on air holding fabrics. These challenges can allow parts of the system to become brittle and subject to potential failure.

Some attempts at providing heated inflation gas have involved positioning a heating element within the interior of an inflation cylinder. Downsides to this approach are that the heating element takes up space within the cylinder, adds weight, and can be subject to damage due to vibration in this position. Improvements to providing heated inflation gas and heated evacuations systems, in general, are thus desirable.

BRIEF SUMMARY

Embodiments of this disclosure thus provide systems and methods for regulating the temperature of the gas used to inflate an evacuation slide, evacuation slide/raft or life raft, as well as regulating the temperature of any other part of the evacuation slide, evacuation slide/raft or life raft.

In a specific example, an electrically powered heating system may be attached to and/or integrated into a portion of the inflatable device, a portion of the inflation system, and/or a portion of the housing or enclosure that houses the inflatable device and/or its related inflation system equipment. The heating system may be one or more heating wire(s), element(s), heating mat(s), heating blanket(s) or other appropriate heating means. The housing or enclosure into which the heating system is attached and/or integrated may be a packboard, an enclosure housing, a wrapper (which is a fabric that encloses a packed evacuation system allowing it to drop as a bundle until inflation occurs), a lacing cover, a carrying case, and/or a pressure vessel sling. In other examples, the heating system may be attached to and/or integrated into an outer portion of a pressure vessel or an inflation system or externally secured to a pressure vessel or an inflation system. In further examples, the heating system may be attached to and/or integrated directly into the evacuation slide, evacuation slide/raft, or life raft itself. In an even further example, the heating system may be attached to and/or integrated directly into the girt of the inflatable device. The general intent is for the heating system to maintain a set (minimum) temperature of the inflation system, the inflation system gas, the pressure vessel, the housing or enclosure, the evacuation slide, evacuation slide/raft or life raft system, or any combination thereof. Embodiments of the present disclosure aim to regulate the temperature of the gas used to inflate the inflatable device.

In one example, there is provided an inflatable evacuation system with regulated heating, comprising: a power source; a heating system; wherein the heating system is attached to or integrated into at least one portion of the inflatable evacuation system. The heating system may comprise one or more heating wires, heating elements, heating mats, heating blankets, or any combination thereof. The inflatable evacuation system may comprise an evacuation slide, an evacuation slide/raft, or a life raft, wherein the heating system is attached to or integrated into material of the inflatable evacuation slide or evacuation slide/raft.

In specific examples, the heating system may be attached to or integrated into a girt of the inflatable evacuation system, a wrapper of the inflatable evacuation system, a lacing cover of the inflatable evacuation system, an interior surface or integrated into a housing of the inflatable evacuation system, a pressure vessel, a pressure vessel sling, or any combination thereof.

The heating system may be attached to at least one portion of the evacuation system via bonding, heat welding, adhesive, silicone, tape, hook and loop materials, snaps, magnets, dovetail slots, stitching, knitting, wrapping, or any combination thereof. The heating system may be at least one heating wire or heating element that is wrapped around the evacuation system, or any portion of the evacuation system. The heating system may be incorporated into at least one portion of the evacuation system via stitching, molding, weaving, filament winding, knitting, or any combination thereof The heating system may deliver constant heat. The heating system may deliver regulated heat once a temperature falls below a specified threshold.

BRIEF DESCRIPTION OF THE DRAWINGS

FIG. 6 shows a side perspective view of a heating system associated with an inflatable device housing, such as a packboard.

DETAILED DESCRIPTION

Embodiments of the present disclosure provide systems and methods to regulate the temperature of the gas used to inflate an inflatable evacuation and/or flotation device used in connection with a vehicle. Specific embodiments are designed for use with evacuation slides, evacuation slide/raft, or life rafts used on an aircraft. The systems and methods regulate the temperature of the gas, as well as the temperature of any other part of the inflatable device through use of an electrically powered heating system.

Figure 1:
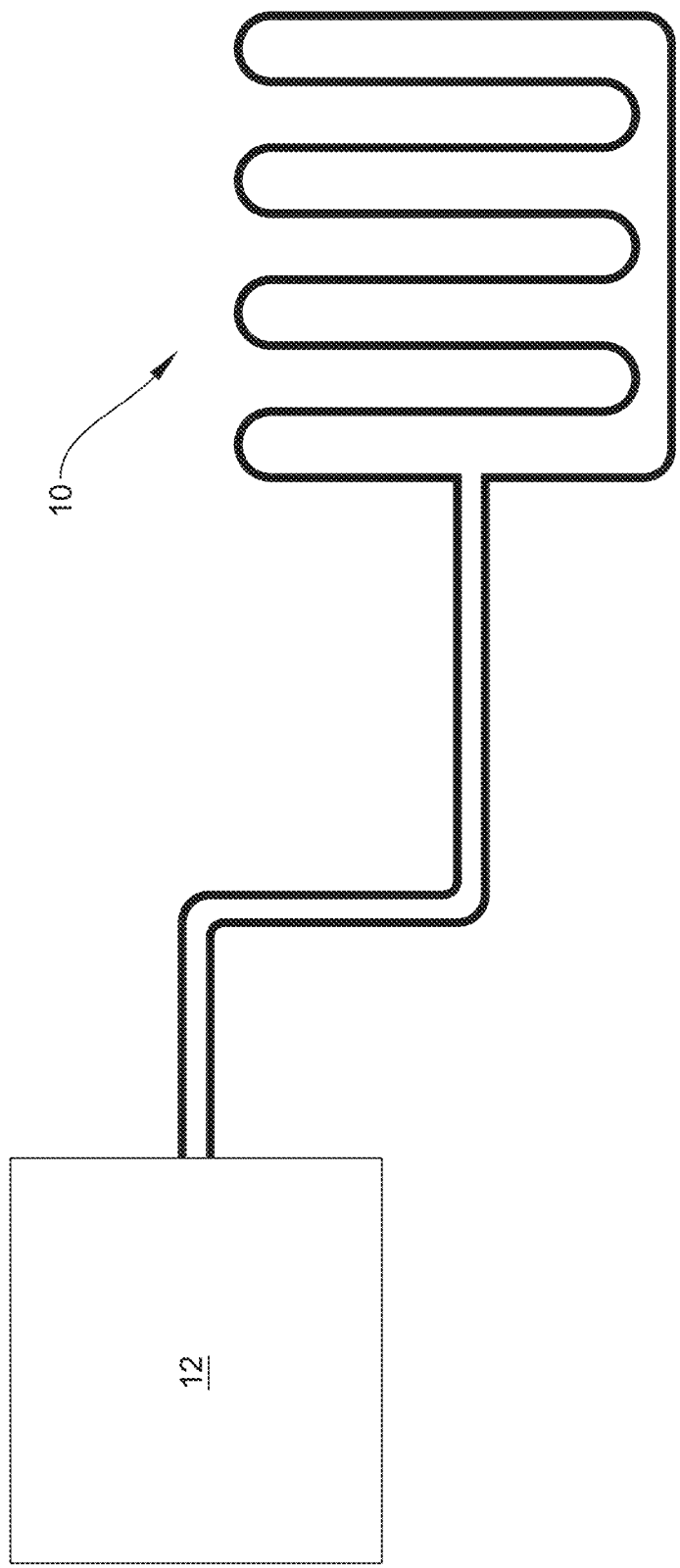
FIG. 1 shows a schematic view of a heating system cooperable with a power source.

FIG. 1 illustrates a heating system 10 and its connection to a power source 12. The power source 12 may be powered from the aircraft. The power source 12 may be powered by the inflation system itself. The power source 12 may be a standalone power source, such as a back-up battery. The power source 12 may be powered using any other type of alternative energy source, such as being powered by a fuel cell, solar powered, or any other option. The heating system 10 may be provided as one or more heating wire(s), element(s), heating mat(s), heating blanket(s) or other appropriate heating means. It should be understood that one of ordinary skill in the art would be able to identify appropriate heating system options. It is understood that the heating system 10 incorporated into the described system should be capable of withstanding extreme temperature fluctuations, withstanding vibrations, operating at various altitudes, and be reliable over defined periods of time. One example of a potential heating system is a self-regulating heater. Such heaters maintain a set temperature without a regulator. Additionally or alternatively, the heating system may be a thin film heater. One of ordinary skill in the art would understand that various types of possible heating systems may be used in connection with the described embodiments. Nonlimiting examples of potential heater types include but are not limited to smart heaters, polyimide thermofoil heaters, silicone rubber heaters, mica heaters, thermal blankets, teflon blankets, or any combination thereof.

Figure 2:
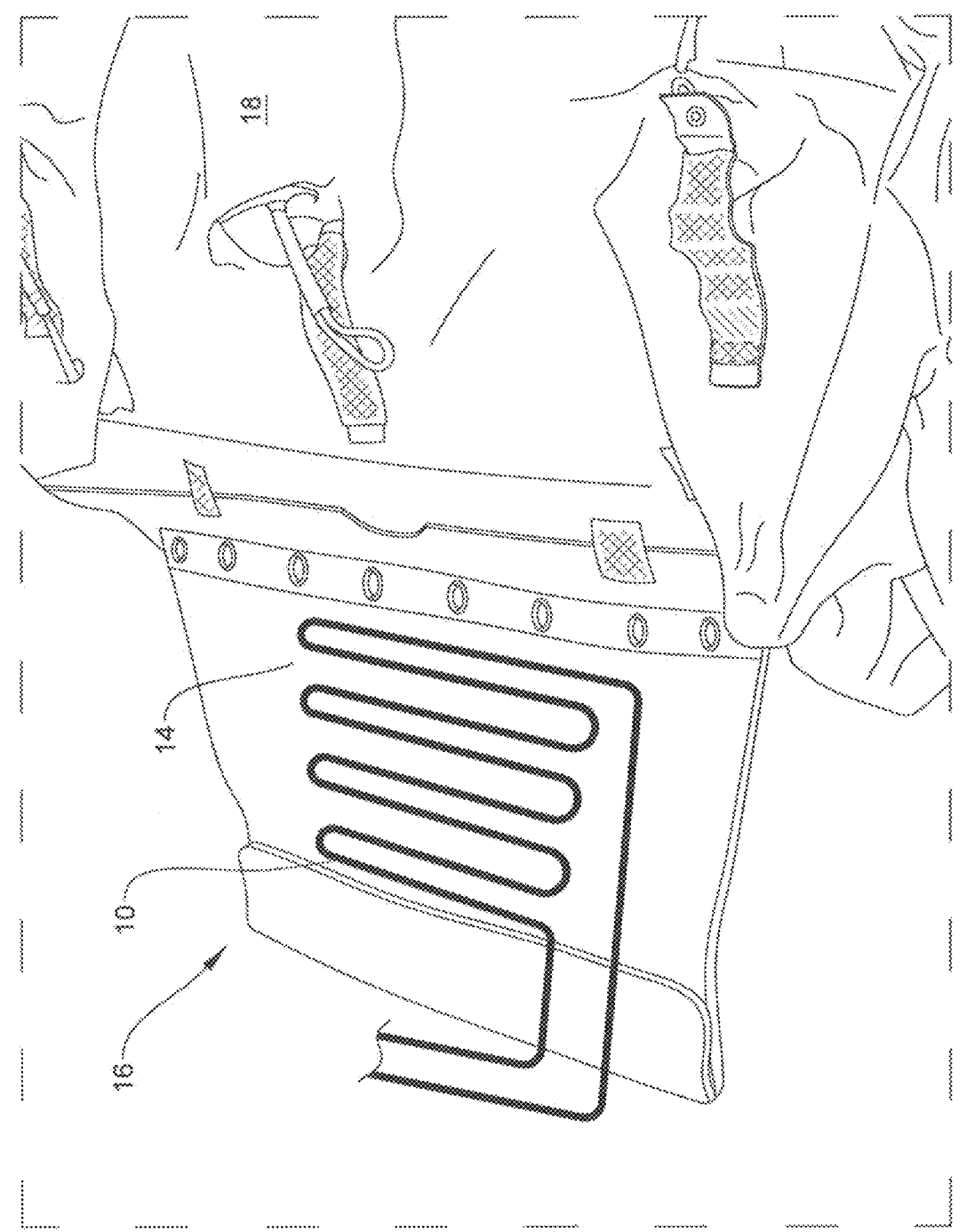
FIG. 2 shows a top perspective view of a heating system associated with an evacuation system girt.

As illustrated by FIG. 2, in one example, the heating system 10 may be attached to and/or integrated into a girt 14 of an inflatable device 16. In this instance, the inflatable device is an evacuation slide 18. The heating system 10 may be overlaid over an upper or lower surface of the girt 14, or both. In another example, the heating system 10 may be incorporated into the material used to form the girt 14. In another example, the heating system 10 may be incorporated into all of a portion of the sliding surface, the body tubes, or any combination thereof.

Figure 3:
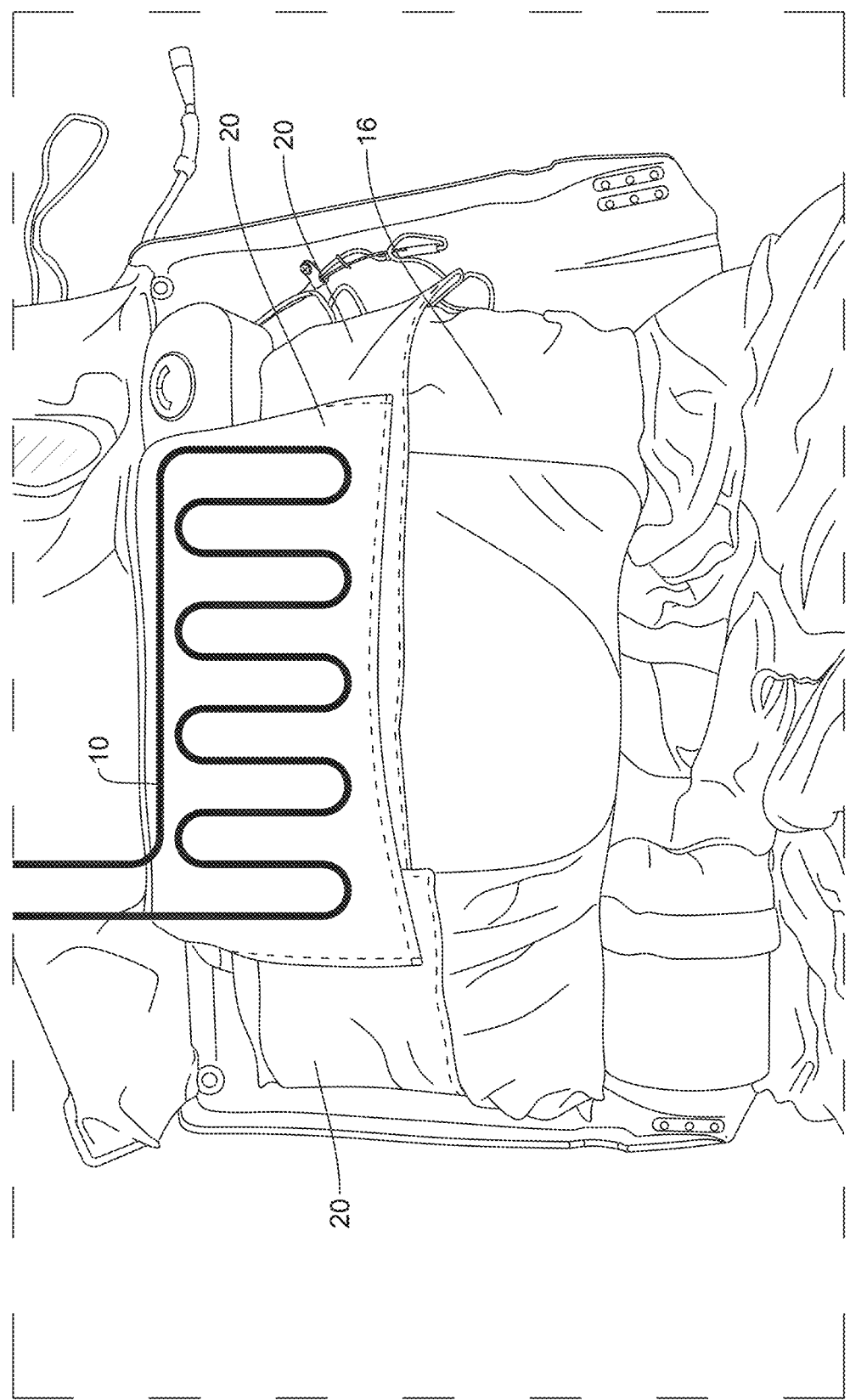
FIG. 3 shows a top perspective view of a heating system associated with an inflatable device wrapper.

As illustrated by FIG. 3, in another example, the heating system 10 may be attached to and/or integrated into an inflatable device wrapper 20. The heating device 10 may be overlaid over an upper or lower surface of the wrapper 20, or both. In another example, the heating system 10 may be incorporated into the material used to form the wrapper 20. In another example, the heating system 10 may be positioned beneath the wrapper 20, such that it is located between the wrapper material and the inflatable device 16 itself. In this example, the heating system 10 is in contact with both the wrapper 20 and the inflatable device 16 by being positioned therebetween.

Figure 5:
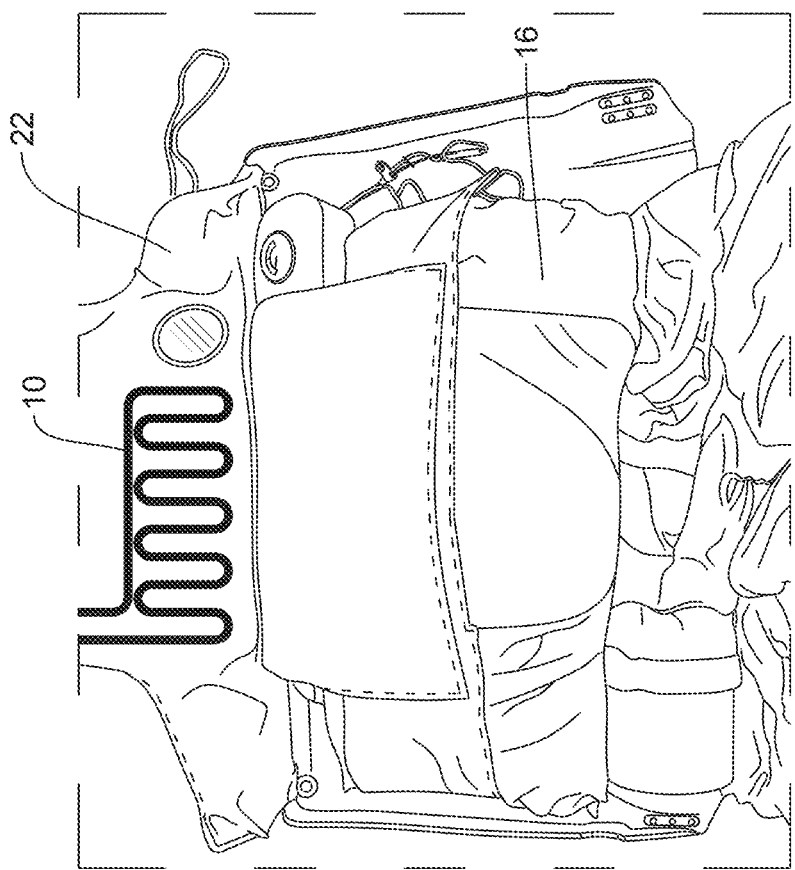
FIG. 5 shows a top perspective view of a heating system incorporated into a lacing cover.
Figure 4:
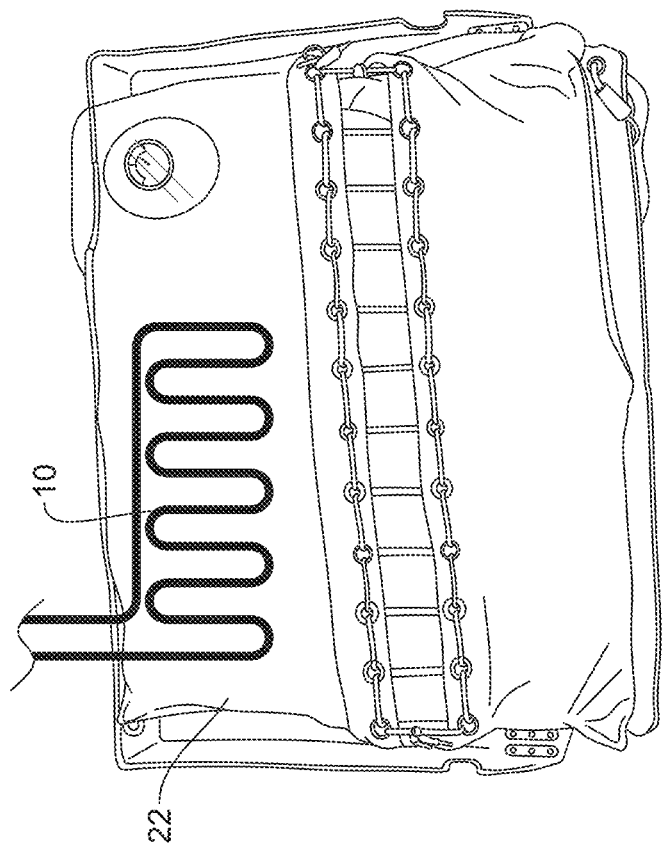
FIG. 4 shows a top perspective view of a heating system associated with a lacing cover.

As illustrated by FIGS. 4 and 5, in another example, the heating system 10 may be attached to and/or integrated into a lacing cover 22. The heating device 10 may be overlaid over an upper or lower surface of the lacing cover 22, or both. This example is illustrated by FIG. 4. In another example, the heating system 10 may be incorporated into the material used to form the lacing cover 22. This example is illustrated by FIG. 5. In another example, the heating system 10 may be positioned beneath the lacing cover 22, such that it is located between the lacing cover material and the inflatable device 16 itself. In this example, the heating system 10 is in contact with both the lacing cover 22 and the inflatable device 16 (or if the inflatable device 16 is wrapped, between the lacing cover material and the wrapper) by being positioned therebetween.

Figure 12:
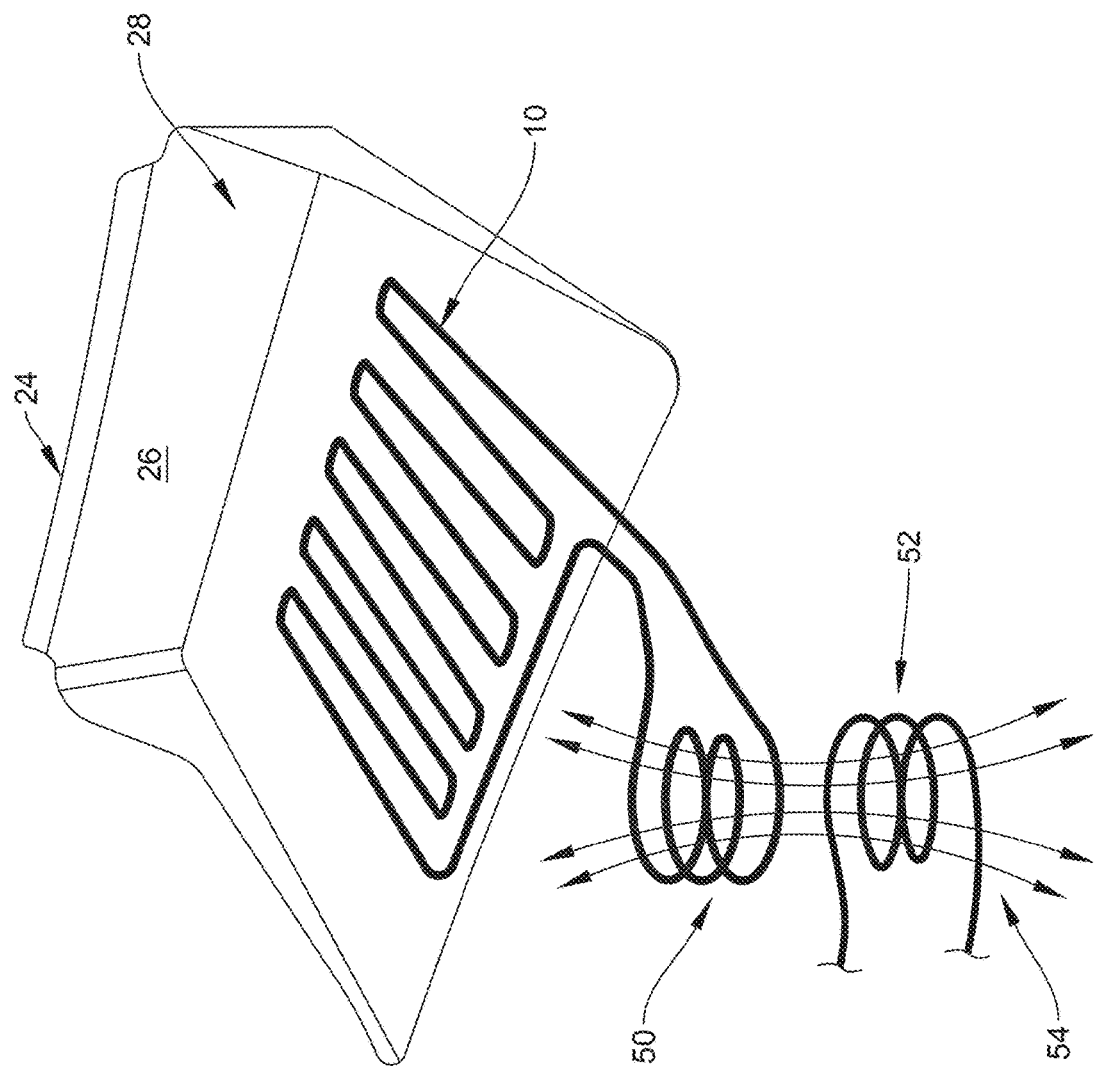
FIG. 12 shows a side perspective of one embodiment employing induction heating for powering the heating system.

In another example, the heating system 10 may be attached to and/or integrated into a housing 24. The housing 24 may be a packboard 26 as illustrated by FIG. 6. FIG. 6 illustrates a packboard 26 having an interior surface 28 that is associated with a heating system 10. Although a specific packboard 26 is illustrated, it should be understood that any inflatable device enclosure or housing may be used and is considered within the scope of this disclosure. In other examples, the housing 24 may be an enclosure, an enclosure door, a container, a carrying case, or any other appropriate component that houses, contains, or otherwise supports an inflatable device and/or its related equipment. As shown, the heating device 10 may be overlaid over an interior surface 28 of the housing 24 such as the packboard 26 shown. In a further example, it is possible for the heating device 10 to be overlaid over an exterior surface of the housing 24 (although this may require a greater amount of heat in order to penetrate the housing and warm the equipment housed therein). In another example, the heating system 10 may be incorporated into the material used to form the housing 24. Examples of this formation may be similar to the pressure vessel incorporation described below. In any of these options, it is possible for the heating to occur via induction heating. Induction heating is the process of heating via contact. An electrically-conducting material may be heated by electromagnetic induction, through heat generated in the material by eddy currents. For example, as illustrated by FIG. 12, regardless of whether the heating system 10 is attached to and/or incorporated into the housing 24, rather than being directly connected to an electric (or other) power source, it is possible for the heating system to generate heat via induction. In a specific example, the heating system 10 may have a receiving power coil 50 that cooperates with a supply power coil 52 via one or more induction lines 54. Alternatively, in order to heat non-conductive materials (such as plastics or glass), induction may be used to heat an electrically-conducting susceptor (which could be graphite or any other appropriate material), which then transfers heat to the non-conducting material.

Figure 7:
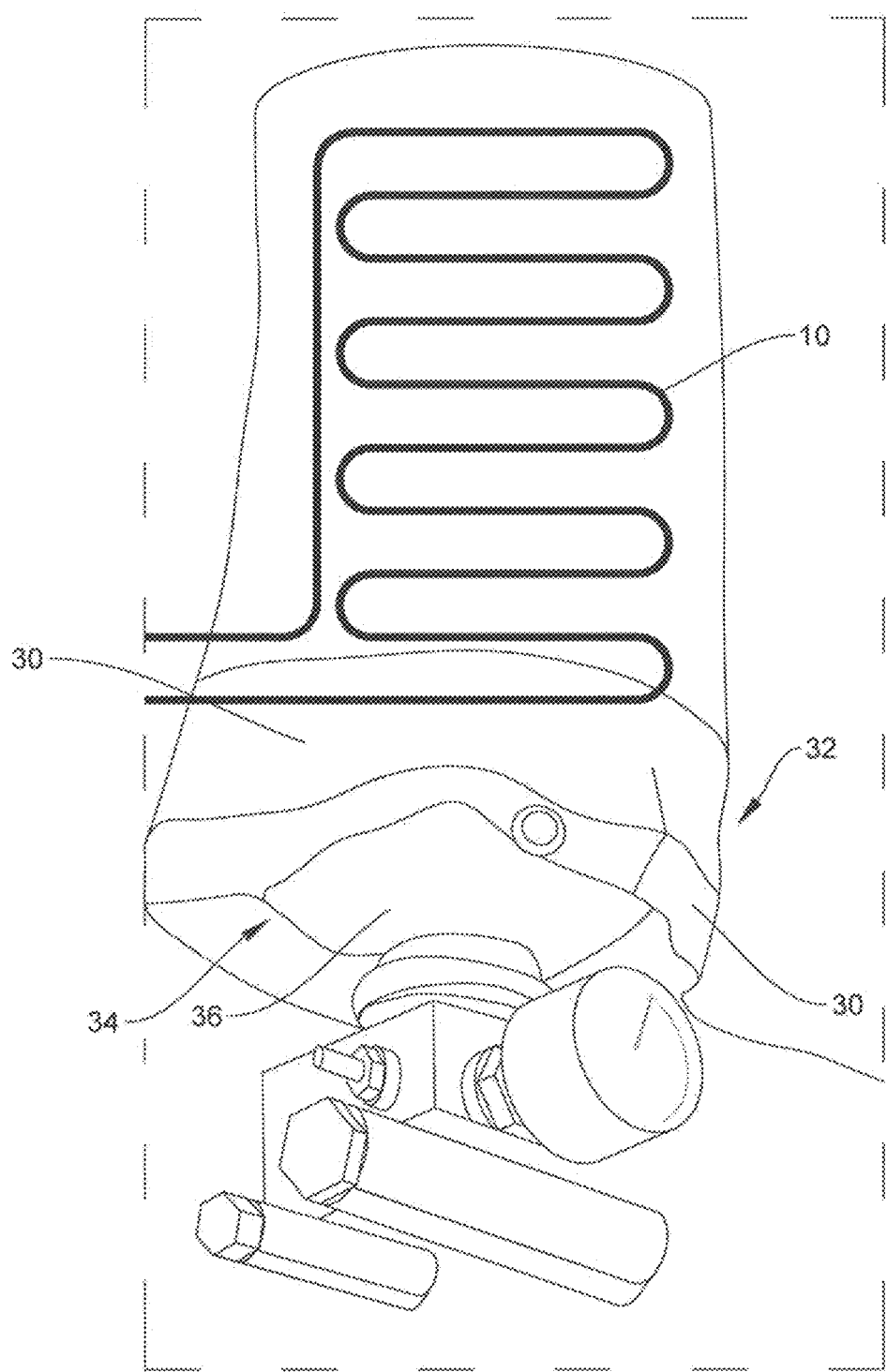
FIG. 7 shows a top perspective view of a heating system associated with a pressure vessel sling.

As illustrated by FIG. 7, in another example, the heating system 10 may be attached to and/or integrated into a pressure vessel sling 30. The heating device 10 may be overlaid over an outer surface 32 (as shown by FIG. 7) of the pressure vessel sling 30, over an inner or interior surface of the pressure vessel sling 30, or both. In another example, the heating system 10 may be incorporated into the material used to form the pressure vessel sling 30. In another example, the heating system 10 may be positioned beneath the pressure vessel sling 30, such that it is located between the pressure vessel sling material and the pressure vessel 34 itself. In this example, the heating system 10 is in contact with both the pressure vessel sling 30 and the pressure vessel 34 by being positioned therebetween.

In another example, the heating system 10 may be attached to an external surface 36 of a pressure vessel 34. If attached to an external surface 36, the heating system 10 may be overlaid over the external surface 36, as would be understood based on this disclosure. This may result in a multi-layer pressure vessel, with one layer being the pressure vessel itself and a second layer being the heating system 10. In one example, it is possible to provide a liner (the liner is generally used as a mold and provides a good gas barrier). The liner may either be aluminum or plastic or any other appropriate material. The next step could be to wrap a heating system 10 around the liner. Then, carbon fiber may be wrapped around the heating system in order to define the pressure vessel (the carbon fiber gives strength and form to the pressure vessel). A final layer of fiberglass wrapping may be provided for shock protection and impact resistance. In another example, it is possible to provide the liner, wrap the carbon fiber around the liner, and wrap a heating system around the carbon fiber, and provide a final layer of fiberglass wrapping. The layers may be secured in any appropriate configuration, using any appropriate securement system, examples which are described below.

It should be understood that it is also possible to manufacture this embodiment without use of a liner. For example, the pressure vessel may be linerless. The pressure vessel may be manufactured using an inflatable/removable bladder. The pressure vessel may be manufactured using a wax mold liner that is subsequently melted. The pressure vessel may be manufactured using a polymeric material that can be dissolved using a dissolving substance. The heating system 10 may be positioned between any layer. Other options are also possible and considered within the scope of this disclosure.

Figure 8:
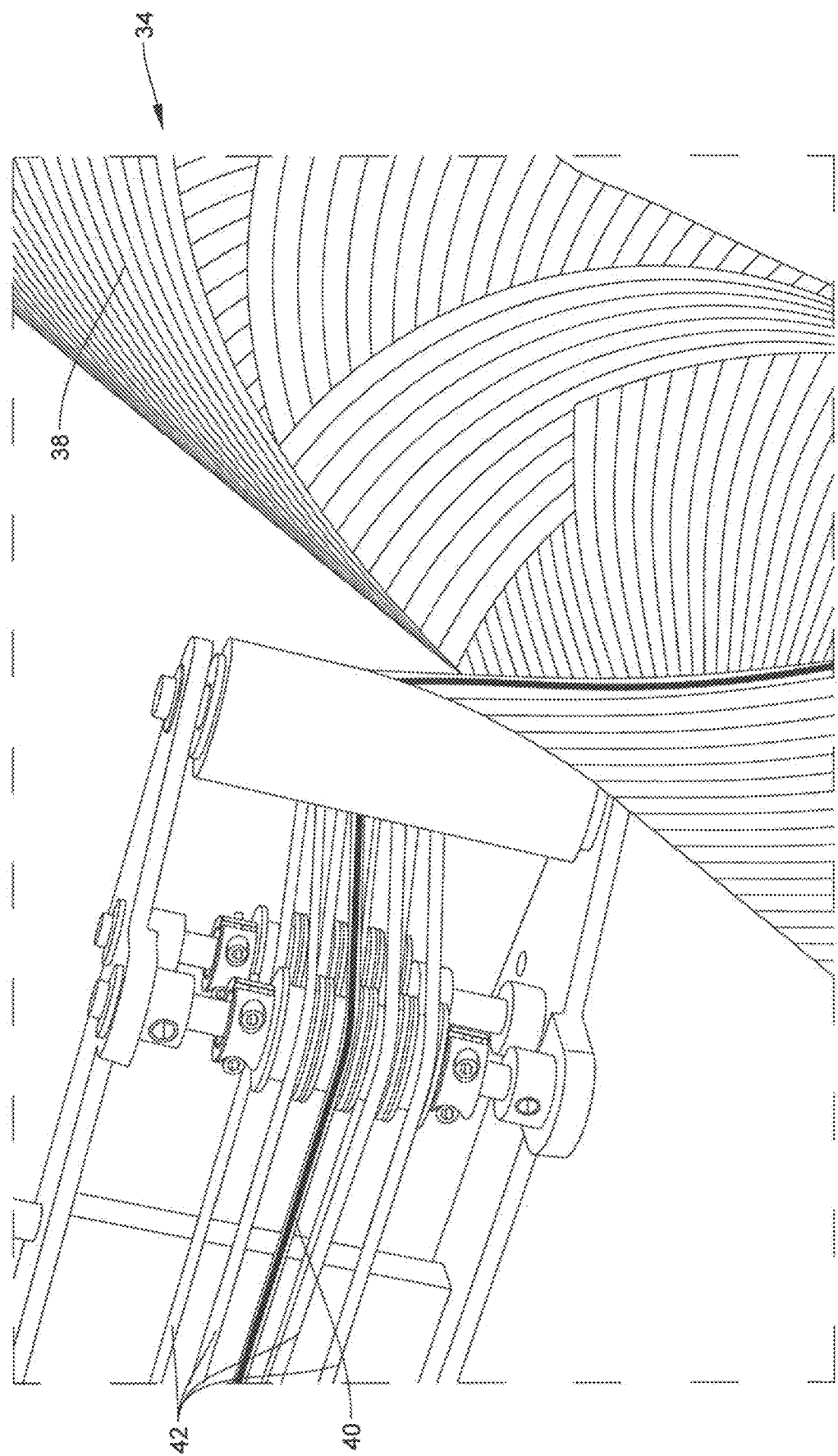
FIG. 8 shows a side perspective view of a heating system wire being incorporated into filaments used to manufacture a pressure vessel.
Figure 9:
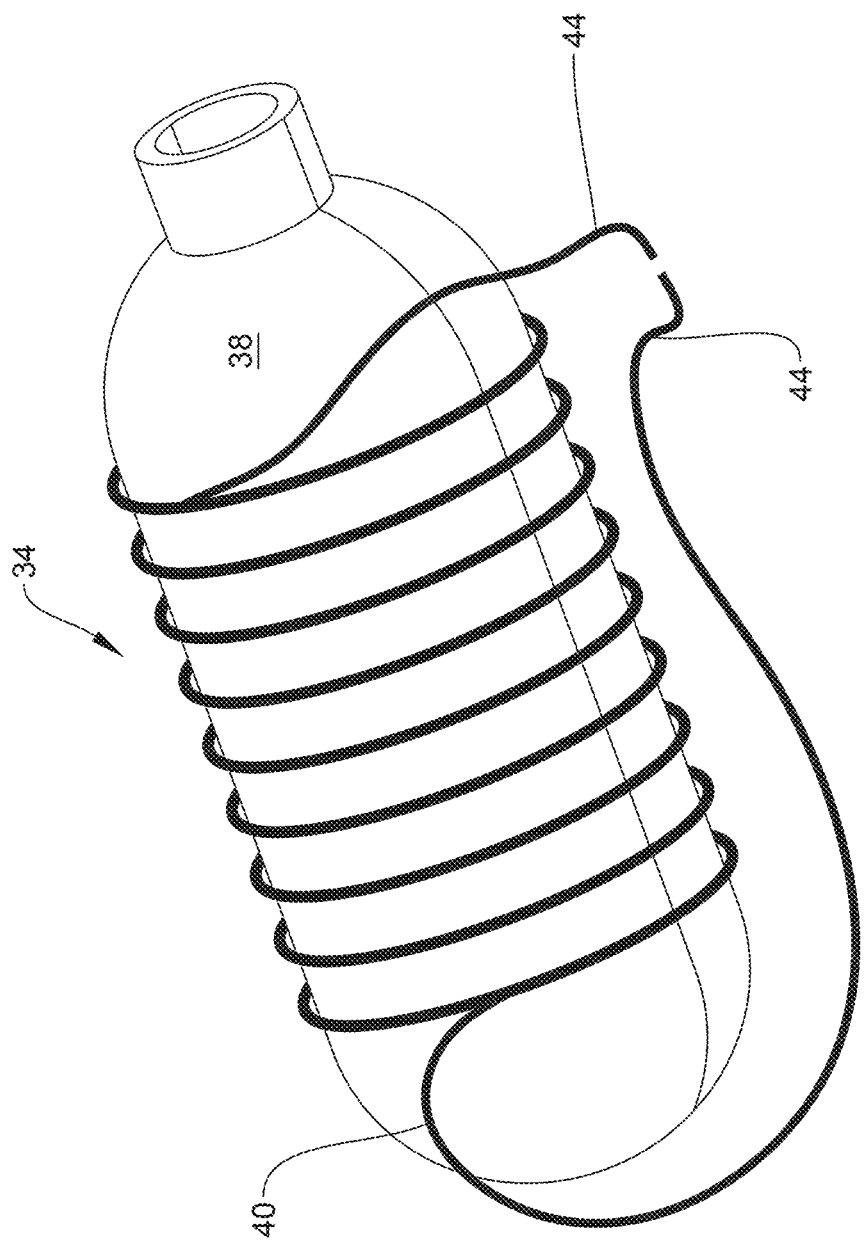
FIG. 9 shows a side perspective view of a pressure vessel having a heating system incorporated into a wall thereof.
Figure 10:
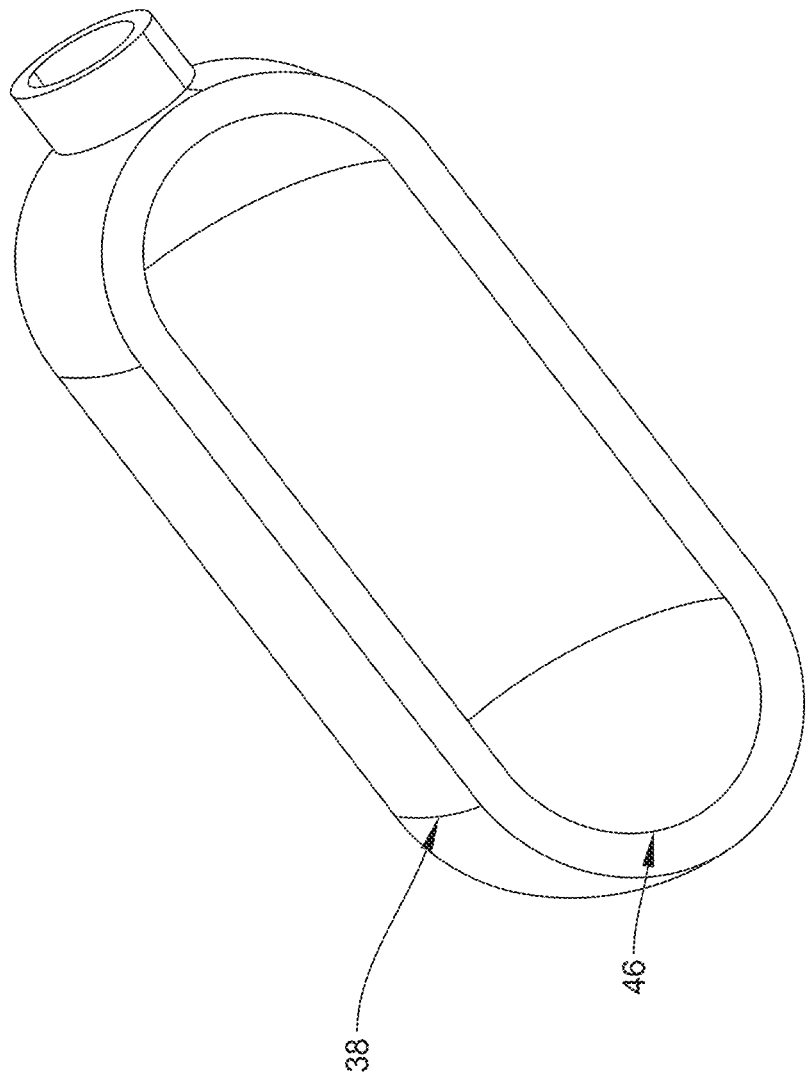
FIG. 10 shows a side cut away view of a heated liner forming a heating system associated with a pressure vessel.

Additionally or alternatively, as shown by FIG. 8, the heating system 10 may be integrated into a wall 38 of the pressure vessel 34. In one example, this technology is referred to filament winding. If the heating system 10 is integrated into a wall 38 of the pressure vessel 34, one or more of the filaments spun or wound into and with other filament materials used to form the pressure vessel wall 38 may be a heating element or wire. For example, if the pressure vessel is made of carbon fiber filaments 42, one of the filaments 42 may be replaced by a heating wire 40 that is a filament wound with the carbon fiber filaments 42 in order to form the pressure vessel. Metal coated fibers can be used to conduct heat. The coated fibers could be carbon, glass or any other reinforcing substance. In another example, the carbon fiber may be copper plated carbon fiber used to form the pressure vessel 34. Whichever wrapping option is used, once the wrapping is finalized, ends 44 of the heating system 10 may be left extended for connection to a power source 12. The result is that the heating system 10 is embedded into the wall 38 of the pressure vessel 34 itself. One example of a completed vessel 34 is illustrated by FIG. 9.

Figure 11A:
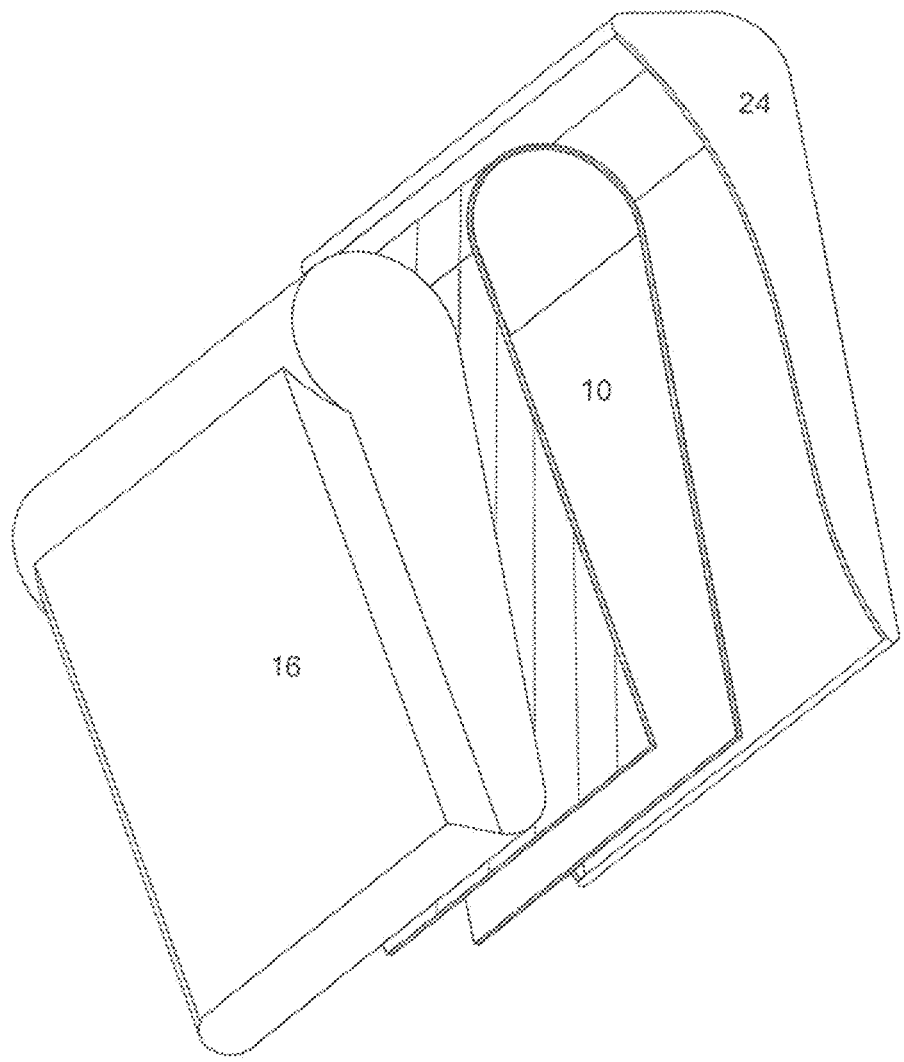
FIG. 11A shows a side exploded view of a heating system, an inflatable device, and an enclosure.
Figure 11B:
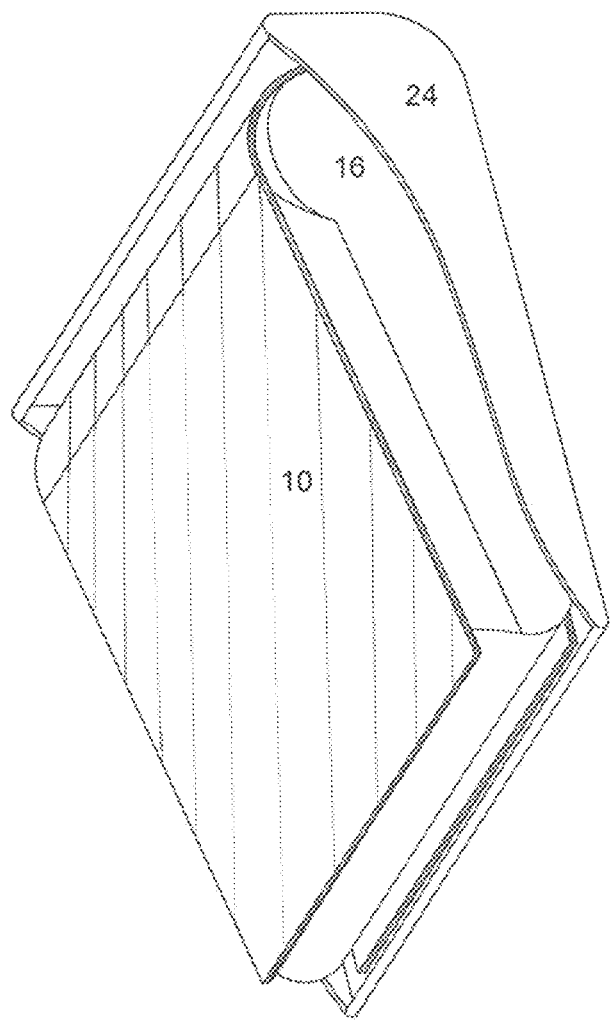
FIG. 11B shows a side view of the heating system wrapped around the inflatable device, with that assembly positioned within an enclosure.

Additionally or alternatively, the metallic liner of the pressure vessel may also be heated alone or in combination with the internal or external surfaces of the pressure vessel. For example, a heated pressure vessel liner 46 may be located immediately interior of the pressure vessel wall 38. It is possible to form the pressure vessel itself around the heated liner 46. In other words, the pressure vessel reservoir may be spun and otherwise wound or formed around the liner 46. The liner may be heated via any type of power source. For example, the power source may be a standalone power source, such as electric power or a back-up battery, or any other type of alternative energy source described herein, such as being powered by a fuel cell, solar powered, or any other option. In a further embodiment, the liner may be heated via induction heating. In this embodiment, the induction heating may be via a receiving power coil and a supply power coil as described above with respect to FIG. 12. In a further example, the heating system 10 may be wrapped around the evacuation slide, evacuation slide/raft, or life raft or any portion of the inflation system. For example, the heating system may function much like a heating blanket. For example, FIG. 11A illustrates an inflatable device 16 configured to be in an enclosure or housing 24. In this example, the heating system 10 resembles a "heated blanket" assembly that can be wrapped around the inflatable device 16. FIG. 11B illustrates the heating system 10 wrapped around the inflatable device 16, with the completed assembly positioned within the housing 24. Additionally or alternatively, the heating system may be stitched, bonded, or woven onto, or into any part of the evacuation slide, evacuation slide/raft or life raft. As described, this may be the inflatable device itself, such as the gas holding material, the floor material, and/or the girt. Additionally alternatively, this may be any of these components that correspond to the inflatable device, including but not limited to the wrapper, the lacing cover, the housing, the pressure vessel sling, and/or the pressure vessel, as detailed above.

Attachment Options:

In each of these described examples, if the heating system 10 is attached to one of the described components, it may be secured using any appropriate attachment mechanism. In one example, the heating system may be bonded onto the intended surface. For example, the heating system may be bonded to the girt 14, the wrapper 20, the lacing cover 22, the housing 24, and/or the pressure vessel sling 30. Attachment may be achieved via bonding, heat welding, adhesive, silicone, tape, hook and loop materials, snaps, magnets, dovetail slots, stitching, knitting, wrapping, or any other securement feature, or any combination thereof. In other examples, the heating system 10 may be applied as a layer during the layup or molding process with the result that the heating system 10 is incorporated into the mold/resulting product. In another example, the heating system 10 may be stitched into the layup of the girt 14, the wrapper 20, the lacing cover 22, the housing 24, and/or the pressure vessel sling 30.

In other examples in which the heating system 10 is integrated into the component, it is possible for the heating system 10 to be woven into, wrapped, spun, filament wound, or otherwise incorporated into the reinforcement layer or layers prior to layup and molding, resulting in an integrated heating system encased in the part (which may be a composite part or otherwise). In a further example, the material comprising at least one portion of the evacuation system is conductive or coated with a conductive substance for the purpose of producing heat. This results in the evacuation slide, evacuation slide/raft, or life raft inherently being a heat producing system for heat regulation.

The heating regulation of the heating system may be controlled via a control system. For example, an upper threshold may be set and whenever the temperature is below the threshold, the heating system may be activated. Once the temperature reaches the threshold, the heating system may be turned off. Additionally or alternatively, heating regulation may be a constant heating system. In this example, a constant specified level of heat may be continuously delivered via the heating system. In either example, it may be necessary to provide a temperature sensor in order to regulate heating temperatures.

It should be understood that various different features described herein may be used interchangeably with various embodiments. For example, if one feature is described with respect to a particular example, it is understood that the same feature may be used with other examples as well.

Changes and modifications, additions and deletions may be made to the structures and methods recited above and shown in the drawings without departing from the scope or spirit of the disclosure or the following claims.

What is claimed is:

1. An inflatable evacuation system with regulated heating, comprising:
a power source;
a heating system comprising a heating element or heating wire;
wherein the heating element or heating wire is integrated into at least one portion of an interior surface of a container that houses an inflatable member, the interior surface of the container is adjacent to the inflatable member of the inflatable evacuation system configured to be inflated upon activation of the inflatable evacuation system, wherein the container comprises inflation gas.

2. The system of claim 1, wherein the heating system comprises one or more heating wires, heating elements, heating mats, heating blankets, or any combination thereof.

3. The system of claim 1, wherein the inflatable evacuation system comprises an evacuation slide, an evacuation slide/raft, or a life raft, wherein the heating system is attached to or integrated into material of the evacuation slide, evacuation slide/raft, or life raft as the inflatable member.

4. The system of claim 1, wherein the heating system is integrated into a girt of the inflatable evacuation system.

5. The system of claim 1, wherein the heating system is integrated into a wrapper of the inflatable evacuation system.

6. The system of claim 1, wherein the heating system is integrated into a lacing cover of the inflatable evacuation system.

7. The system of claim 1, wherein housing of the inflatable evacuation system includes the container, wherein the heating system is integrated into an interior surface or integrated into the housing of the inflatable evacuation system.

8. The system of claim 7, wherein the housing comprises a packboard, an enclosure, an enclosure door, a container, a carrying case, or any combination thereof.

9. The heating system of claim 1, wherein the heating system comprises at least one heating wire or heating element that is wrapped around the inflatable evacuation system, or any portion of the inflatable evacuation system.

10. The system of claim 1, wherein the heating system is incorporated into at least one portion of the inflatable evacuation system via stitching, molding, weaving, filament winding, knitting, or any combination thereof.

11. The system of claim 10, wherein the heating system comprises at least one heating wire or heating element that is woven into or stitched into one or more composite reinforcement layers prior to layup and molding.

12. The system of claim 1, wherein the power source is an electric power source, a solar power source, or any combination thereof.

13. The system of claim 1, wherein the heating system delivers constant heat.

14. The system of claim 1, wherein the heating system delivers regulated heat once a temperature falls below a specified threshold.

15. The system of claim 1, wherein material comprising at least one portion of the inflatable evacuation system is conductive or coated with a conductive substance for the purpose of producing heat.

16. The system of claim 1, wherein the heating system is heated via induction heating.

17. An inflatable evacuation system with regulated heating, comprising:
- a power source;
- a heating system comprising a heating element or a heating wire;
- wherein the inflatable evacuation system comprises a pressure vessel comprising inflation gas, and wherein at least one of: the heating element or heating wire is integrated into an external surface of the pressure vessel, or integrated into a wall of the pressure vessel.

18. The system of claim 17, wherein the heating wire is wound with filaments creating a pressure vessel wall or a pressure vessel liner.

19. The system of claim 17, wherein the heating system is incorporated into at least one portion of the inflatable evacuation system via stitching, molding, weaving, filament winding, knitting, or any combination thereof.

20. The system of claim 17, wherein the power source is an electric power source, a solar power source, or any combination thereof.

\* \* \* \* \*